(12) United States Patent
Vishnoi et al.

(10) Patent No.: US 11,210,271 B1
(45) Date of Patent: Dec. 28, 2021

(54) DISTRIBUTED DATA PROCESSING FRAMEWORK

(71) Applicant: FAIR ISAAC CORPORATION, Roseville, MN (US)

(72) Inventors: Amit Vishnoi, Bangalore (IN); Sourav Das, Badkulla-West Bengal (IN)

(73) Assignee: Fair Isaac Corporation, Rosedale, MN (US)

(*) Notice: Subject to any disclaimer, the term of this patent is extended or adjusted under 35 U.S.C. 154(b) by 0 days.

(21) Appl. No.: 16/998,909

(22) Filed: Aug. 20, 2020

(51) Int. Cl.
| | | |
|---|---|---|
| *G06F 16/00* | (2019.01) | |
| *G06F 16/18* | (2019.01) | |
| *G06F 16/25* | (2019.01) | |
| *G06F 11/07* | (2006.01) | |
| *G06F 16/27* | (2019.01) | |
| *G06Q 30/02* | (2012.01) | |

(52) U.S. Cl.
CPC ...... *G06F 16/1858* (2019.01); *G06F 11/0772* (2013.01); *G06F 16/1805* (2019.01); *G06F 16/1865* (2019.01); *G06F 16/258* (2019.01); *G06F 16/278* (2019.01); *G06Q 30/02* (2013.01)

(58) Field of Classification Search
CPC ............. G06F 16/1858; G06F 11/0772; G06F 16/278; G06F 16/1805; G06F 16/258; G06F 16/1865; G06Q 30/02
See application file for complete search history.

(56) References Cited

U.S. PATENT DOCUMENTS

| | | | | |
|---|---|---|---|---|
| 9,384,493 | B2* | 7/2016 | Harris | G06Q 30/0201 |
| 2009/0276368 | A1* | 11/2009 | Martin | G06Q 40/02 |
| | | | | 705/36 R |
| 2011/0173093 | A1* | 7/2011 | Psota | G06Q 30/06 |
| | | | | 705/26.35 |

FOREIGN PATENT DOCUMENTS

WO WO-2017161446 A1 * 9/2017 ........... G06Q 40/025

OTHER PUBLICATIONS

Hurley et al., Credit Scoring in the Era of Big Data. (Year: 2017).*
Agarwal et al., Financial Inclusion and Alternate Credit Scoring for the Millennials: Role of Big Data and Machine Learning in Fintech. (Year: 2020).*

* cited by examiner

*Primary Examiner* — Syed H Hasan
(74) *Attorney, Agent, or Firm* — Mintz Levin Cohn Ferris Glovsky & Popeo, PC; Paul Brockland, Esq.

(57) ABSTRACT

In one aspect, there is provided a system. The system may store instructions that result in operations when executed by the at least one data processor. The operations may include receiving raw transactional data, collating, and reading the raw transactional data from the plurality of data sources. The operations may further include randomly sampling the raw transactional data. The operations may further include transforming the raw transactional data into at least one resilient distributed dataset. The operations may further include mapping the at least one resilient distributed dataset with a corresponding unique key. The operations may further include aggregating the at least one resilient distributed dataset on a key field. The operations may further include iterating over a lookup table. The operations may further include aggregating the data lines corresponding to the unique key associated with the at least one resilient distributed dataset. The operations may further include appending (Continued)

in-memory data lines serially to form a consumer level data string.

20 Claims, 5 Drawing Sheets

DISTRIBUTED DATA PROCESSING FRAMEWORK

TECHNICAL FIELD

The subject matter described herein relates generally to transactional data and, more specifically, to distributed data processing of transactional data from various data sources among various computing resources to obtain a consumer level data.

BACKGROUND

Data processing may refer to the collection and/or manipulation of data including, for example, validation, sorting, summarization, aggregation, analysis, reporting, classification, and/or the like. But traditional data processing applications may be inadequate for handling exceptionally voluminous and/or complex data sets known as "Big data." Instead, big data may require complex data processing applications having advanced capabilities specifically tailored for the ingestion, cleansing, storage, analysis, sharing, transformation, and/or visualization of exceptionally voluminous and/or complex data sets.

SUMMARY

Systems, methods, and articles of manufacture, including computer program products, are provided for multi-level data aggregation, data filtering, data input generation from raw transaction level data generated at a data source.

In one aspect, there is provided a system. The system may include at least one data processor and at least one memory. The at least one memory may store instructions that result in operations when executed by the at least one data processor. The operations may include receiving, from a plurality of data sources, raw transactional data. The operations may further include collating and reading the raw transactional data from the plurality of data sources. The operations may further include randomly sampling, responsive to collating and reading, the raw transactional data. The operations may further include performing, responsive to the randomly sampling, a check of consistency and integrity of the raw transactional data. The operations may further include transforming the raw transactional data into at least one resilient distributed dataset. The operations may further include mapping the at least one resilient distributed dataset with a corresponding unique key. The operations may further include aggregating the at least one resilient distributed dataset on a key field or multiple key fields. The operations may further include receiving a request for an entity. The operations may further include iterating over a lookup table, the lookup table including consumer profile information mapped to keys of different tables. The operations may further include aggregating, responsive to the iterating, the data lines corresponding to the unique key associated with the at least one resilient distributed dataset. The operations may further include appending in-memory data lines serially to form a consumer level data string.

In some variations, one or more features disclosed herein including the following features may optionally be included in any feasible combination. For example, the raw transactional data may satisfy a size threshold. The receiving may occur at a frequency including one of daily, weekly, and monthly. The performing the check may include sending an error message if the check fails. The resilient distributed datasets may be stored in a file system. The resilient distributed datasets may be stored across multiple memory partitions in the file system. The file system may include a Hadoop file system. The transforming may include performing a consistency check on the raw transactional data. The transforming may further include cleaning, responsive to the consistency check, data fields of the raw transactional data to remove unwanted and bad data fields. The transforming may further include aggregating, responsive to the cleaning, the raw transactional data. The transforming may further include grouping, responsive to the aggregating, the aggregated raw transactional data on one or more levels so that transactional activity of the aggregated raw transactional data over a time period is represented by a single data line. The transforming may further include outputting, responsive to the grouping, the single data line. The transforming may be performed by a plurality of worker nodes. The transforming may be allocated among the plurality of worker nodes by a driver. The receiving, the collating, and/or the reading may be performed by a program driver.

Implementations of the current subject matter may include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to credit scoring applications, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
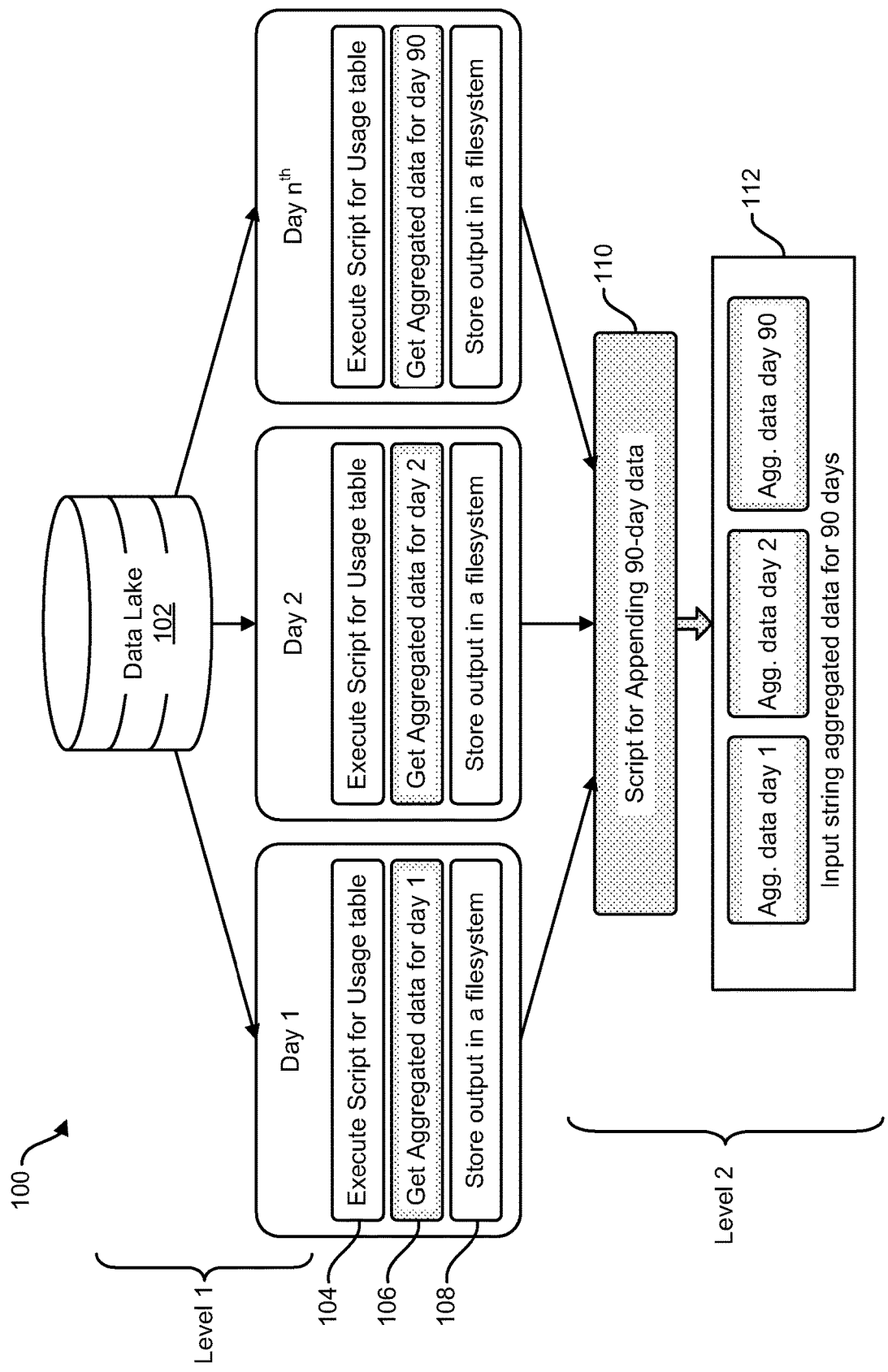
FIG. 1 depicts a functional block diagram of a system in which features consistent with the described subject matter may be implemented.

Transactional data (e.g., Big data) may be generated in large volumes (e.g., terabytes per day). This transactional data may be generated from various data sources in various industries, countries, data formats, etc. Big data technical challenges include capturing data, data storage, data analysis, search, sharing, transfer, visualization, querying, updating, information privacy and data source, or the like. Embodiments described herein address problems in data capture, storage, analysis, transfer, querying, and the like. Embodiments described herein address problems in data capture, storage, analysis, transfer, querying, and the like. The improvement occurs through a distributed data framework designed to collect, sort, aggregate, format, map, preprocess data, and the like.

According to various estimates, over 2.5 quintillion bytes of data are created every day. For instance, in every minute of every day, Apple® users download more than 51,000 apps, Netflix® subscribers stream more than 77,000 hours of video, Twitter® users send more than 350,000 tweets, and Facebook® users "like" more than 4 million posts. Each of these actions by users generates data. The data can be transactional data, i.e. data with a timestamp which has been generated as the result of a transaction conducted by the user, or otherwise generated by activity, outside of any formal transaction. Data files may be spread across different sources in multiple files of small chunks. Data from these data sources may be received in a raw form that may contain unsorted, duplicated and non-uniform and even sometime unstructured.

Raw multi-level transaction-level data may be stored in various data repositories and/or data structures. For example, in the telecom industry the transactional data may be stored in tables such as usage transactions, billing/collection, SMS, etc. The transactions may be stored in the tables continuously throughout a timeline. Thus, the data records for an individual consumer may be scattered throughout the table at various timestamps. The dataset may be large and may generate at various frequencies such as daily, bi-weekly, monthly, or the like. A quantity of data records in some of the tables may range in the number of billions which may cover information of millions of individuals and/or entities in a consumer base. Conventional data evaluation methodologies attempting to handle such a wide range of data, often fail. The framework described herein may be capable of handling such multi-dimensional large volume data and parse the data for scoring or other data analysis.

Even with advancements in big data technologies, it can often be very difficult to understand and evaluate, let alone use, this data. Traditional data evaluation methodologies often rely on a complete understanding of the data being evaluated as well as a specific objective for the evaluation. What is needed is a system and method for evaluating datasets across multiple objectives covering the breadth of a business with limited understanding of the data being evaluated, to provide data-based evidence to the business which informs the creation of various types of actionable analytics.

For example, conventional data evaluation methodologies are incapable of handling/reading such humongous data file at a time. Data aggregation/grouping requires data to be sorted on at least a field. And in-place data sorting among 1.2-1.5 Billion records with ~100 field per record takes too much time. In memory operation for huge data not possible. Larger I/O operation takes toll on time due to time and space complexity. Even with larger processing resources (e.g., increased RAM and CPU speed), handling big data requests may often result with process starvation and out of memory exception errors. Accordingly, the classical programming approach to big data evaluation is incapable of efficient usage of available computing resources.

Implementations described herein relate to a process framework of shifting most of the processing work done for big data analysis to be accomplished with concurrent distributed processing threads (e.g., processing nodes) and data processing is further enhanced by preprocessing raw transactional data to transform the raw data into a structured format to facilitate more efficient and faster processing speeds. The processing work may be accomplished by distributing a data processing workload in parallel with multiple processing (e.g., CPU) threads/nodes rather than by using a single thread or node. This parallel, concurrent and distributed processing across multiple processing nodes may speed up the data handling process significantly. Decisions on whether to perform the two-step or multi-step transformation process is based on the nature and frequency of incoming transactional data and how the end process is expecting the data Concurrent processing of physical memory described herein may reduce the time for data handling to more quickly free up memory or processing resources for other processes and/or tasks.

FIG. 1 depicts a functional block diagram of a high level end-to-end process 100 of pulling raw transaction level data from a single/multiple data repository (data lake) to a finished consumer level data that may be useful for a software system, in which features consistent with the described subject matter may be implemented. As illustrated, the process 100 may include a data lake/data repository 102 configured to store data in multiple data files having a certain time stamp. The data files may be pushed into the repository with a certain frequency decided by a repository administrator (not shown). As noted, this raw data may be may generated at various frequencies such as daily, bi-weekly, monthly, or the like. The process 100 may implement a two-step framework to convert this raw transactional data into a consumer-level structured data capable for further processing and implementation. Communication may occur through indirect communications, such as over a network (e.g., a local area network, a wide area network, a wireless network, the Internet, or the like).

As illustrated in FIG. 1, level 1 of the two-step process framework may include aggregating data that is generated daily or at some other frequency. In level 1, this data, which may be available in chunks inside the repository, are pulled and collated, sampled for consistency, filtered and aggregated on required levels to get consumer level data for a particular date. As further shown, steps 104, 106, and 108 may include a series of steps in which daily/weekly/bi-weekly/etc. aggregation tasks may be performed for different types of data decided by the framework. Here, different types of data may mean different segments of data which are correlated to one another (e.g., in telecommunications industry, all the telecommunications data are stored in distinct, relational segments such as SMS data, incoming call data, outgoing call data, network data, billing data, etc. At level 1 and for each day or frequency period, a processor may, at 104, execute a script for a usage table. The usage table may include data usage of a telecom company or other service provider. For example, the usage table may include usage data (e.g., call data, data transfer, SMS, or the like) for a plurality of consumers of the company for the time period (e.g., hourly, daily, weekly, monthly, etc.). As a result of executing the script at 104, at 106, a processor may obtain aggregated usage data for day 1 or other time period. After obtaining the aggregated data, at 108, the output data may be stored in a file system such as Hadoop. The output data may be transformed from the initial raw/unstructured data from the data lake 102 to a resilient distributed data (RDD) structure or to another data structure. The transformation may be determined and implemented by an analytics engine such as Apache Spark.

In level 2, this collated and daily aggregated data may be joined to form a consumer level data that spans a particular period (e.g., 90 days). As further shown in FIG. 1 at level 2, a processor may, at 110, execute a script for aggregating and appending the output data from level 1 over a time period (e.g., 90-days). This final aggregated consumer level data may be the output of the process/framework that may be useful for some software/system that requires high level consumer information over a period. At 112, the processor may accumulate all the data rows of the output data by aggregating available files. In-memory data lines may be appended serially to form a consumer-level data string which may be the final output of the two-step (or two-level) framework process.

The two step process framework is responsible for performing the entire processes represented in FIG. 1, process 100. Since the framework deals with a large quantity of data files that is not feasible to process with a single computer resource (e.g., CPU and/or memory), it may utilize underlying technologies such as Hadoop Distributed File System (HDFS) storage system and/or Apache Spark cluster computing engine to distribute its workload and manage the data processing on the available computing system.

At least a portion of the illustrated process 100 may include hardware and/or software that interacts with a data repository, users, and/or other software applications for receiving, handling, all the incoming data generated at one or more data sources. The data lake 102 may be an unstructured, unorganized collection of data which may be processed for information. The data lake 102 may be physically stored in a hardware server or across a plurality of hardware servers. The data lake 102 may include row store data, a column-store data, a schema-less data, or any other type of data. The process 100 may be configured to perform OLTP (online transaction processing) and/or OLAP (online analytical processing), which may include complex analytics and tasks. Any of the data stored in the data lake 102 may additionally or alternatively be stored in the memory of a computing system, which may be required in order to process the data. As noted, a large accumulation of table data stored in the data lake 102 may affect the performance and/or resources of the memory, the core software, and/or a processor of the computing process 100.

In order to get an entire consumer level data for a particular time period, the raw transactional data may be first aggregated and normalized, and then the aggregated data for a time period may be joined. In the first stage (e.g., level 1), the raw unstructured data is transformed into a structured data-form for the second stage. For example, a computing system 100 may determine data received from multiple sources are in the form of raw transactional level data, such as data in the data lake 102. In some aspects, the process 100 may transform the raw transactional data based on the data satisfying a size threshold.

Figure 2:
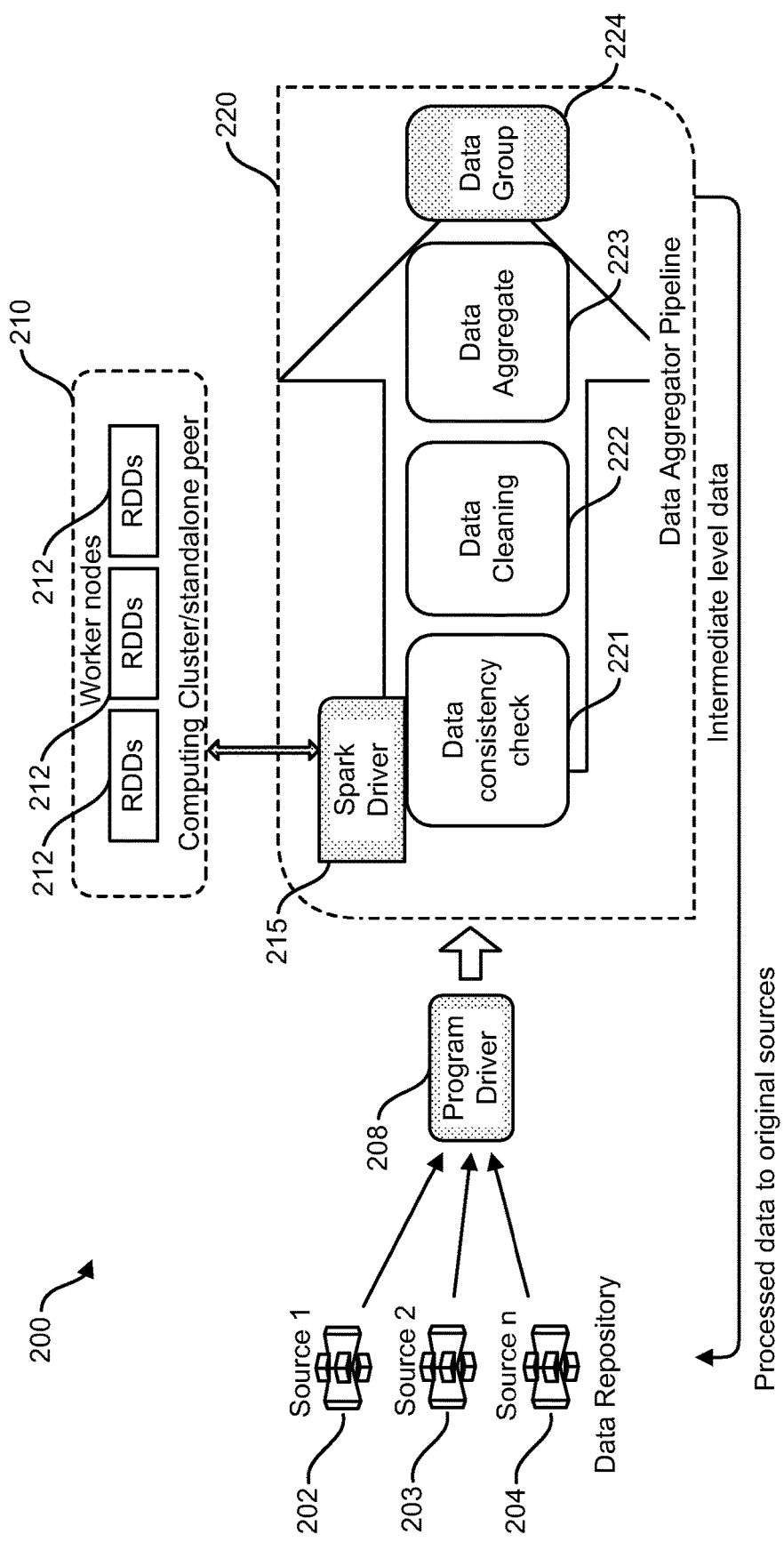
FIG. 2 depicts an example data aggregation system, in accordance with some example implementations.

FIG. 2 depicts an example data aggregation system 200 for level 1 and/or level 2 of the process 100, in accordance with some example implementations. In the example of FIG. 2, The system 200 is the part of the framework that performs the first level of data aggregation. As shown, data sources 202,203,204 may be data repositories that store the low transactional level data in distinct segments. A framework driver 208 may be the entry point to the framework which may trigger the system to collate all available data from repository (local or remote) for a particular date. Then it may initialize the Hadoop HDFS memory system (or other file system) and Apache Spark (or other) engine so that the collated data gets available to a distributed computing cluster and combine the computing resources to sync and schedule jobs. As shown in FIG. 2, data from data sources 202, 203, and 204 (e.g., from data lake 102) may be aggregated by the framework driver 208 and fed into a data aggregator pipeline 220. The data aggregator pipeline 220 includes a driver 215 (e.g., a Spark driver), a data consistency checker 221, a data cleaner 222, a data aggregator 223, and a data grouper 224. The jobs of 221, 222, 223, 224 may be interdependent processes responsible to transform multiple raw data (of a single consumer) to a single useful information. Data consistency checker 221 may perform a data consistency check through random sampling and field checking on the data rows. Data cleaner 222 may clean the unwanted and bad data fields from the dataset. The data aggregator 223 and the data grouper 224 may perform aggregation and grouping on one or more level (e.g., coarse to granular as per requirement) so that all the transactional activity over/on a time can be represented by a single data line. This single data line may be the output of the aggregation level 1. The driver 215 may be a program that declares transformations and actions on data and submits such requests to a cluster (e.g., computing cluster 210). The computing cluster 210 includes worker nodes 212 configured to transform raw data from the data sources 202, 203, and 204 into a resilient distributed dataset (RDD) structure or to another data structure. Worker nodes 212 may be the computing resources (e.g., CPU and RAM), where the data resides in RDDs. The framework may utilize a driver 215 (e.g., an Apache Spark engine) for the jobs (221-224) creation and scheduling them over worker nodes 212.

Resilient distributed datasets (RDDs) are an immutable distributed collection of objects. Each dataset in RDD is divided into logical partitions, which may be computed on different nodes of a cluster (e.g., cluster 210). During RDD creation, the raw data records (e.g., from the data sources 202, 203, and 204) passes through filters which remove invalid data rows and non-important data columns (e.g., data consistency check 221 and data cleaner 222). This way, the data aggregator pipeline 220 results in RDDs of precise data fields (e.g., cleaned data) which may be rolled up in level 2 of the process 100. The RDDs may reside in a file system (e.g., a Hadoop file system) memory in multiple partitions so that the distributive computing could be facilitated.

The RDDs may be mapped with a corresponding unique key. The unique key may be a composite key, such as a key that contains multiple key fields. The data aggregator 223 may aggregate RDDs on a key field. The aggregation process threads on the available CPU cores and data aggregation may occur partition-wise. Finally, the resultant aggregated values may be stored on the file system (e.g., the Hadoop file system). For some tables, the direct aggregation of fields may not apply and for such tables, the data grouper 224 may apply grouping to the data to determine a transaction pattern and output the pattern in a single data line rather than an entire group of data.

In order to combat the increase in time consumption for processing large datasets, it may be beneficial to allocate the processing among multiple processing threads (e.g., worker nodes 212). For example, CPU threads may be allocated by an operating system of a computing system or an analytics engine such as an Apache Spark engine. The CPU threads may allow application logic and/or processes to be separated into several concurrent execution paths. This feature may be useful when complex applications and/or processes have many tasks that can be performed at the same time, as described herein for Big data handling.

Figure 3:
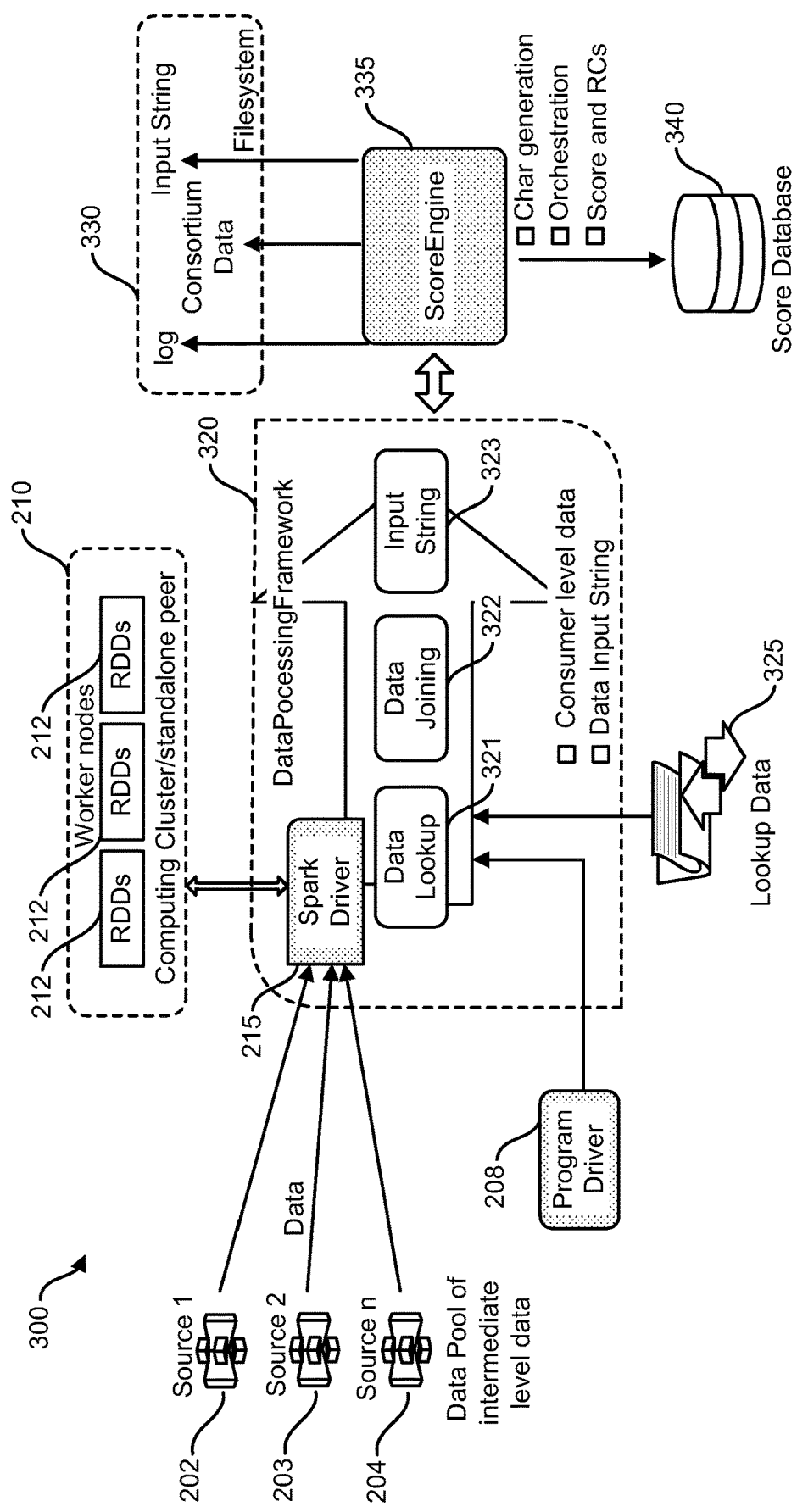
FIG. 3 depicts an example distributed data processing system, in accordance with some example implementations.

FIG. 3 depicts an example distributed data processing system 300, in accordance with some example implementations. The system 300 may include a system where the framework can be integrated. In some aspects, the distributed data processing system 300 may be implemented for level 2 of the process 100, in accordance with some example implementations. In the example of FIG. 3, data from data sources 202, 203, and 204 (e.g., from data lake 102) may be aggregated by the data aggregator pipeline 220 of FIG. 2 and fed into the data processing framework 320. The data processing framework 320 includes the driver 215 (e.g., a Spark driver), a data lookup 321, a data joiner 322, and an input string 323. The data lookup 321 may iterate over a lookup table containing consumer profile information mapped to keys of different tables. The data joiner 322 may aggregate the data lines corresponding to the key from RDDs created with level 1 output data and may hold all the data lines in-memory. Upon accumulation of all the data rows by aggregating the available files, the in-memory data lines are appended serially to form the input string 323 (e.g., a consumer level data string) which may be the final output of the data processing framework 320. Further shown in the example of FIG. 3, the input string 323 may be inputted to a score engine 335 to generate scores (e.g., credit scores) based on consumer-level input string 323 data. Score engine 335 may be a data analytic engine (e.g., may be a score engine as illustrated here) that may process a batch of consumer to reveal consumer patterns or behavior. Since the process is in batch mode, it may require consumer level data over a vast period of time in consumable text-form which can be passed as data argument to a software API/RPC. File system 330 may include collaterals that may be thrown by the score engine 335 in response to the data received by it. Database 340 may be a database/storage where the software output may be stored. While the input string 323 is shown inputted to the score engine 335, it may also be inputted to other processing engines for other analysis.

Framework driver 208 may be the entity (entry point) that may expose the framework function as a service to an external entity. Framework system 320 may be a part of the framework where the output generated by system 200 over a time period is further joined in order to generate an API consumable data input string 323. The score engine 325 may provide a necessary lookup needed by the framework to locate a consumer ID and collate all the daily aggregated information from the plurality of data sources. This data collation again may utilize the computing cluster 210. The computing cluster 210 may be a single standalone machine where each processor core may include a virtual worker node 212, or it may include a physical machine in a LAN.

Figure 4:
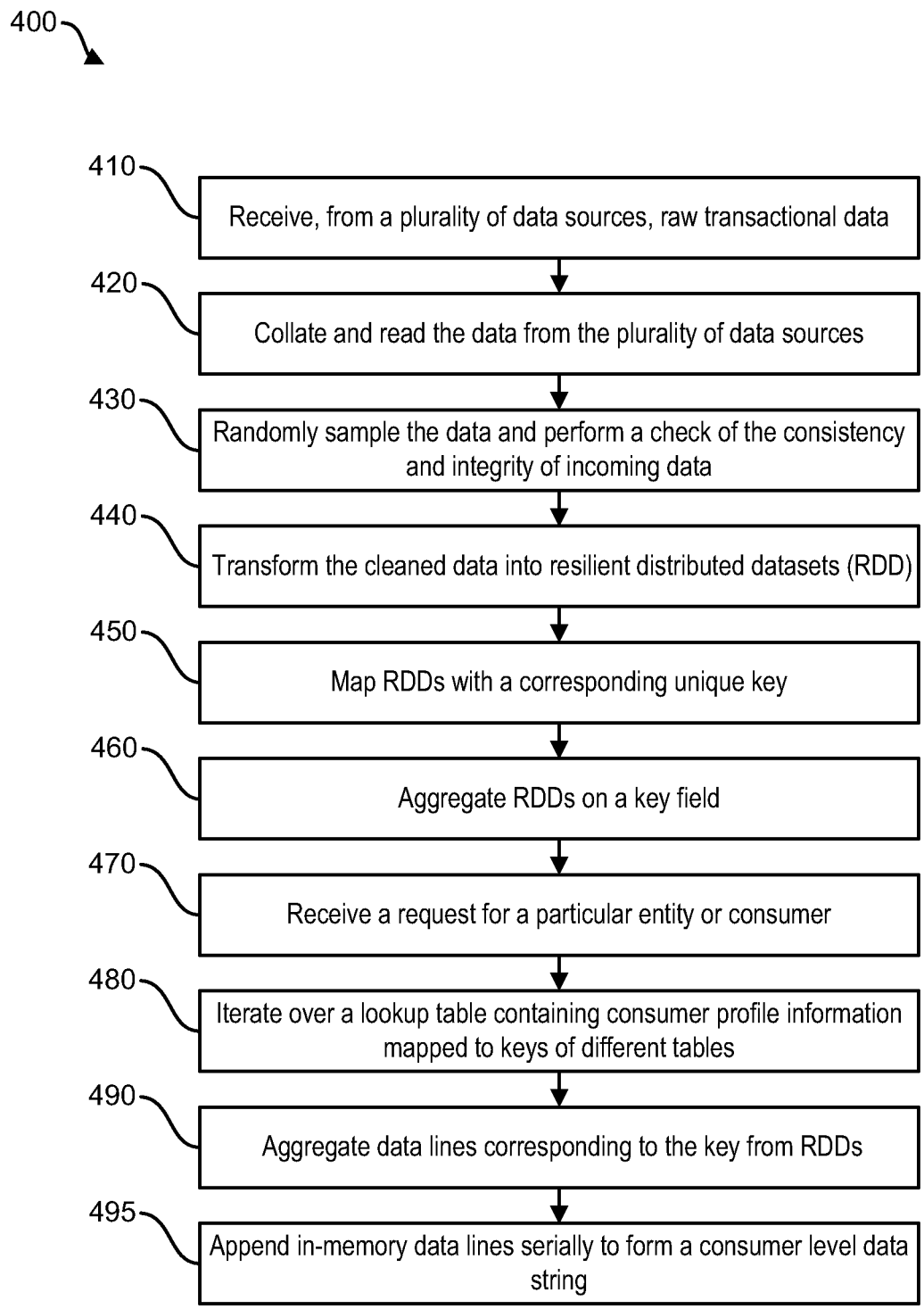
FIG. 4 depicts a flowchart illustrating a process for aggregating and distributing data processing, in accordance with some example implementations.

FIG. 4 depicts a flowchart illustrating a process 400 for an end-to-end process framework and distributed data processing, in accordance with some example implementations. Referring to FIGS. 1-3, the process 400 may be performed by a computing apparatus such as, for example, the worker node 212, a server, a client device, the computing apparatus 500, and/or the like.

At operational block 410, the apparatus 500, for example, may, receive, from a plurality of data sources, raw transactional data. For example, the apparatus 500 data sources (e.g., telecommunications companies, streaming services, social media companies, or the like) may transfer its transactional data to a file system for storage, to a third party server for processing, or the like. The raw transactional data may be generated and/or transferred periodically such as hourly, daily, weekly, monthly, or the like. The raw transactional data may be unstructured data resulting from commercial and transactional activity.

At operational block 420, the apparatus 500, for example, may, collate and read the data from the plurality of data sources. The data collation and reading may facilitate further processing on the data. For example, the data may be randomly sampled based on or responsive to the collation and reading of the data.

At operational block 430, the apparatus 500, for example, may, in response to collation and reading of the data, randomly sample the data and perform a check of the consistency and integrity of incoming data. For example, 7%-10% of the data may be sampled from random files. Data checking may be performed on multiple parameters and if the data satisfies the parameters, the process may continue. If the check fails, the process may halt and send a proper warning message.

At operational block 440, the apparatus 500, for example, may, transform the cleaned data into at least one resilient distributed dataset (RDD). During RDD creation, the raw data records may pass through filters (e.g., the data consistency checker 221 and the data cleaner 222) which may remove invalid data rows and non-important data columns. The data aggregator 223 and the data grouper 224 may perform aggregation and grouping on one or more levels (e.g., coarse to granular as per requirement) so that all the transactional activity over/on a time period can be represented by a single data line. This way, the apparatus 500 (e.g., data aggregator pipeline 220) may output RDDs of precise data fields (e.g., cleaned data) that may be rolled up for further processing. This RDDs may be stored in a file system (e.g., file system 330) memory in multiple partition so that distributive computing could be facilitated.

At operational block 450, the apparatus 500, for example, may map/flat-map RDDs with a corresponding unique key. The unique key may be composite key (e.g., a key that contains multiple key fields). For example, in response to creating the RDDs, the RDDs may be map to a unique key to allow a processor to search and identify a particular RDD. For example, the mapping procedure may build key/value RDDs pairs. When datasets are described in terms of key/value pairs, it is a common feature required to aggregate statistics across all elements with the same key/value. Programs may have a set of operations that combine values that own the same key/value. These operations return RDDs and thus are transformations rather than actions. Key/value RDDs pairs may facilitate data grouping, sorting, and joining operations.

At operational block 460, the apparatus 500, for example, may, aggregate RDDs on a key field. The aggregation process may occur on processing threads of available CPU cores and data aggregation may occur partition-wise. Finally, the resultant aggregated values may be stored on a file system (e.g., file system 330). For example, the aggregation process may be performed by the data aggregator pipeline 220 and may occur concurrently across the multiple threads (e.g., CPU threads of worker nodes 212). After all threads have finished aggregating data, the aggregated interim level data may be stored in a file system, such as a Hadoop file system for level 2 processing.

For some tables, the direct aggregation of fields may not apply and for such tables, the data grouping may need to be applied to get a transaction pattern and output the pattern in a single data line rather than in an entire group of data.

At operational block 470, the apparatus 500, for example, may, receive a request for a particular entity or consumer (e.g., request for a credit score), and may read the interim level data over a period (e.g., 90 days) into RDD. For example, as shown in FIG. 1, the daily data stored in the file system in level 1, are aggregated and appended for a period of 90 days in level 2.

At operational block 480, the apparatus 500, for example, may, iterates over a lookup table containing consumer profile information mapped to keys of different tables. For example, the apparatus 500 may iterate over lookup table 325 which may contain a mapping of individual/consumer profile information to a key (e.g., unique key) of different tables (e.g., usage table, SMS table, billing table, or the like).

At operational block 490, the apparatus 500, for example, may, take up a key from lookup and start aggregating the data lines corresponding to the key associated with the RDDs created with interim level data and hold all the data lines in-memory for faster access of data. The in-memory data operation during joining of aggregated data over a time period may reduce CPU processing time by eliminating the input/output (I/O) cycle and thus makes the process faster.

At operational block 495, the apparatus 500, for example, may, append in-memory data lines serially to form a consumer level data string. The consumer level data string (e.g., input string 323) may be the final output of the framework.

Figure 5:
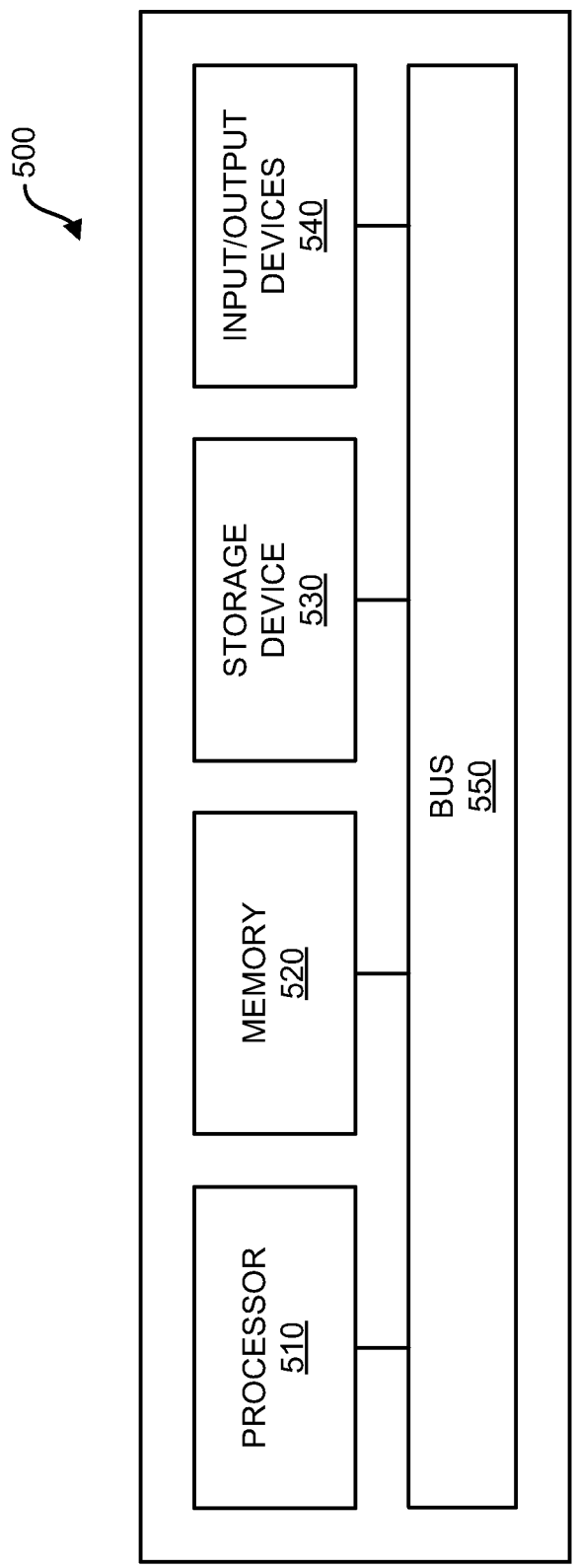
FIG. 5 depicts a block diagram illustrating a computing apparatus, consistent with implementations of the current subject matter When practical, similar reference numbers denote similar structures, features, or elements.

FIG. 5 depicts a block diagram illustrating a computing apparatus 500 consistent with implementations of the current subject matter. Referring to FIGS. 1-4, at least a portion of the computing apparatus 500 may be used to implement at least a portion of the computing process 100, an apparatus providing the data aggregator pipeline 220, an apparatus providing the data processing framework 320, a server, the process 400 and/or the like.

As shown in FIG. 5, the computing apparatus 500 may include a processor 510, a memory 520, a storage device 530, and input/output devices 540. The processor 510, the memory 520, the storage device 530, and the input/output devices 540 may be interconnected via a system bus 550. The processor 510 may be capable of processing instructions for execution that may implement operations consistent with those described herein. Such executed instructions may be implement by one or more components of, for example, the computing system 110, the user access device 140 and/or the access device 165. In some example implementations, the processor 510 may be a single-threaded processor. Alternately, the processor 510 may be a multi-threaded processor. The processor 510 may be capable of processing instructions stored in the memory 520 and/or on the storage device 530 to display graphical information for a user interface provided via the input/output device 540.

The memory 520 may be a computer readable medium such as volatile or non-volatile that stores information within the computing apparatus 500. The memory 520 may store data structures representing configuration object databases, for example. The storage device 530 is capable of providing persistent storage for the computing apparatus 500. The storage device 530 may be a floppy disk device, a hard disk device, an optical disk device, or a tape device, or other suitable persistent storage means. The input/output device 540 provides input/output operations for the computing apparatus 500. In some example implementations, the input/output device 540 includes a keyboard and/or pointing device. In various implementations, the input/output device 540 includes a display unit for displaying graphical user interfaces. In some aspects, a visual display of one or more table aspects may be based on table size, table usage/lock history, for read and/or write functions, and table load status history. In some aspects, for each pass/period/run of a decision process described herein, one pixel may be reserved for each individual table. The color value of the pixel may be made up of the following table properties: 2 bits for actual read locking; 1 bit for write locking; 1 bit for the load status (loaded, unloaded); and some bits for the table size.

According to some example implementations, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet). The input/output device 540 may include one or more antennas for communication over the network with the computing systems. Wireless networks may include Wi-Fi, WiMAX, and cellular networks (2G/3G/4G/5G), and/or any other wireless network.

In some example implementations, the computing apparatus 500 may be used to execute various interactive computer software applications that may be used for organization, analysis and/or storage of data in various formats. Alternatively, the computing apparatus 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 440. The user interface may be generated and presented to a user by the computing apparatus 500 (e.g., on a computer screen monitor, etc.).

In some implementations, a machine learning model of a machine learning system may evaluate the impact of allocating processes and/or applications among multiple worker nodes 212. The model may assume that the future use of the allocated memory segments/resource is not significantly different from the old one. If so, then the algorithm may make more accurate allocation decisions for threads to clear physical memory or process data. If the usage or performance changes significantly, further training may allow the algorithm to adapt to the changed usage and/or performance.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A system, comprising:
at least one data processor; and
at least one memory storing instructions which, when executed by the at least one data processor, result in operations comprising:
receiving, from a plurality of data sources, raw transactional data;
collating and reading the raw transactional data from the plurality of data sources;
randomly sampling, responsive to collating and reading, the raw transactional data;
performing, responsive to the randomly sampling, a check of consistency and integrity of the raw transactional data;
transforming the raw transactional data into at least one resilient distributed dataset;
mapping the at least one resilient distributed dataset with a corresponding unique key;
aggregating the at least one resilient distributed dataset on a key field;
receiving a request for an entity;
iterating over a lookup table, the lookup table including consumer profile information mapped to keys of different tables;
aggregating, responsive to the iterating, data lines corresponding to the unique key associated with the at least one resilient distributed dataset; and
appending in-memory data lines serially to form a consumer level data string.
2. The system of claim 1, wherein the raw transactional data satisfies a size threshold.

3. The system of claim 1, wherein the receiving occurs at a frequency, the frequency including one of daily, weekly, and monthly.

4. The system of claim 1, wherein performing the check comprises sending an error message if the check fails.

5. The system of claim 1, wherein the resilient distributed datasets are stored in a file system.

6. The system of claim 5, wherein the resilient distributed datasets are stored across multiple memory partitions in the file system.

7. The system of claim 1, wherein the transforming comprises:
- performing a consistency check on the raw transactional data;
- cleaning, responsive to the consistency check, data fields of the raw transactional data to remove unwanted and bad data fields;
- aggregating, responsive to the cleaning, the raw transactional data;
- grouping, responsive to the aggregating, the aggregated raw transactional data on one or more levels so that transactional activity of the aggregated raw transactional data over a time period is represented by a single data line; and
- outputting, responsive to the grouping, the single data line.

8. The system of claim 1, wherein the transforming is performed by a plurality of worker nodes.

9. The system of claim 8, wherein the transforming is allocated among the plurality of worker nodes by a driver.

10. The system of claim 1, wherein the receiving, the collating, and/or the reading is performed by a program driver.

11. A method comprising:
- receiving, by at least one processor from a plurality of data sources, raw transactional data;
- collating and reading, by the at least one processor, the raw transactional data from the plurality of data sources;
- randomly sampling, by the at least one processor and responsive to collating and reading, the raw transactional data;
- performing, by the at least one processor and responsive to the randomly sampling, a check of consistency and integrity of the raw transactional data;
- transforming, by the at least one processor, the raw transactional data into at least one resilient distributed dataset;
- mapping, by the at least one processor, the at least one resilient distributed dataset with a corresponding unique key;
- aggregating, by the at least one processor, the at least one resilient distributed dataset on a key field;
- receiving, by the at least one processor, a request for an entity;
- iterating, by the at least one processor, over a lookup table, the lookup table including consumer profile information mapped to keys of different tables;
- aggregating, by the at least one processor and responsive to the iterating, data lines corresponding to the unique key associated with the at least one resilient distributed dataset; and
- appending in-memory data lines serially to form a consumer level data string.

12. The method of claim 11, wherein the raw transactional data satisfies a size threshold.

13. The method of claim 11, wherein the receiving occurs at a frequency, the frequency including one of daily, weekly, and monthly.

14. The method of claim 11, wherein performing the check comprises sending an error message if the check fails.

15. The method of claim 11, wherein the resilient distributed datasets are stored in a file system.

16. The method of claim 15, wherein the resilient distributed datasets are stored across multiple memory partitions in the file system.

17. The method of claim 11, wherein the transforming comprises:
- performing a consistency check on the raw transactional data;
- cleaning, responsive to the consistency check, data fields of the raw transactional data to remove unwanted and bad data fields;
- aggregating, responsive to the cleaning, the raw transactional data;
- grouping, responsive to the aggregating, the aggregated raw transactional data on one or more levels so that transactional activity of the aggregated raw transactional data over a time period is represented by a single data line; and
- outputting, responsive to the grouping, the single data line.

18. The method of claim 11, wherein the transforming is performed by a plurality of worker nodes.

19. The method of claim 18, wherein the transforming is allocated among the plurality of worker nodes by a driver.

20. A non-transitory computer readable medium storing instructions which, when executed by at least one processor, cause operations comprising:
- receiving, from a plurality of data sources, raw transactional data;
- collating and reading the raw transactional data from the plurality of data sources;
- randomly sampling, responsive to collating and reading, the raw transactional data;
- performing, responsive to the randomly sampling, a check of consistency and integrity of the raw transactional data;
- transforming the raw transactional data into at least one resilient distributed dataset;
- mapping the at least one resilient distributed dataset with a corresponding unique key;
- aggregating the at least one resilient distributed dataset on a key field; receiving a request for an entity;
- iterating over a lookup table, the lookup table including consumer profile information mapped to keys of different tables;
- aggregating, responsive to the iterating, data lines corresponding to the unique key associated with the at least one resilient distributed dataset; and
- appending in-memory data lines serially to form a consumer level data string.

* * * * *